United States Patent
Sumizawa et al.

(10) Patent No.: US 7,636,634 B2
(45) Date of Patent: Dec. 22, 2009

(54) ON-VEHICLE INFORMATION TERMINAL

(75) Inventors: Akio Sumizawa, Zama (JP); Hiroshi Minagawa, Zama (JP); Wataru Oikubo, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 427 days.

(21) Appl. No.: 10/569,377

(22) PCT Filed: Aug. 25, 2004

(86) PCT No.: PCT/JP2004/012167
§ 371 (c)(1),
(2), (4) Date: Feb. 24, 2006

(87) PCT Pub. No.: WO2005/020187
PCT Pub. Date: Mar. 3, 2005

(65) Prior Publication Data
US 2007/0005241 A1  Jan. 4, 2007

(30) Foreign Application Priority Data
Aug. 26, 2003 (JP) .............................. 2003-300838

(51) Int. Cl.
*G01C 21/00* (2006.01)
(52) U.S. Cl. ...................................... 701/211; 340/988
(58) Field of Classification Search ................. 701/211, 701/200, 206–208, 212; 340/988, 995.1, 340/990, 995.11, 995.15, 995.19, 995.2, 340/995.24
See application file for complete search history.

(56) References Cited

U.S. PATENT DOCUMENTS

| | | | | |
|---|---|---|---|---|
| 4,760,531 A * | 7/1988 | Yasui et al. | ................. | 701/200 |
| 5,732,385 A * | 3/1998 | Nakayama et al. | .......... | 701/201 |
| 5,739,772 A * | 4/1998 | Nanba et al. | ................ | 340/990 |
| 5,982,301 A * | 11/1999 | Ohta et al. | ............... | 340/995.2 |
| 6,505,120 B2 * | 1/2003 | Yamashita et al. | .......... | 701/211 |
| 6,693,564 B2 * | 2/2004 | Niitsuma | ................. | 340/995.2 |
| 6,978,208 B2 * | 12/2005 | Endo et al. | .................. | 701/202 |

FOREIGN PATENT DOCUMENTS

DE  42 19 326 A1  12/1992

(Continued)

OTHER PUBLICATIONS

International Search Report dated Nov. 16, 2004 (Two (2) pages).

(Continued)

*Primary Examiner*—Dalena Tran
(74) *Attorney, Agent, or Firm*—Crowell & Moring LLP

(57) ABSTRACT

An on-vehicle information terminal includes a current position detection unit that detects the current position of the subject vehicle, a route setting unit that sets a route from the current position of the subject vehicle detected by the current position detection unit to a destination and a display control unit that displays at a display device an enlarged map around the next guidance-requiring intersection on the route having been set by the route setting unit. The display control unit displays the enlarged map by displaying the current position and the next guidance-requiring intersection in a single screen at the display device and rendering the route between the two points as a straight line.

15 Claims, 10 Drawing Sheets

FOREIGN PATENT DOCUMENTS

| | | |
|---|---|---|
| DE | 197 38 745 A1 | 3/1999 |
| JP | 04-314085 A | 5/1992 |
| JP | 08-201099 A | 9/1996 |
| JP | 11-002537 A | 6/1999 |
| JP | 11-202762 A | 7/1999 |
| JP | 2001-336945 A | 12/2001 |

OTHER PUBLICATIONS

English language German Office Action dated Jul. 22, 2008 (Three (3) pages).

\* cited by examiner (a) SIMPLE ENLARGED MAP (b) LINEAR ENLARGED MAP (c) ALTERNATIVE ENLARGED MAP

ON-VEHICLE INFORMATION TERMINAL

TECHNICAL FIELD

The present invention relates to an on-vehicle information terminal that displays a simplified map by using map data.

BACKGROUND ART

There are methods known in the related art through which an original map is simplified based upon map data used for map display. For instance, the apparatus disclosed in a patent reference literature 1 simplifies the original map by executing processing such as linearization or orthogonalization to linearize or orthogonalize the shapes of roads in the map data and displaying landmark information over a specific range defined with a mask. Through the display of the map having been simplified as described above, an easy-to-read map is provided.

Patent reference literature 1: Japanese Laid Open Patent

DISCLOSURE OF THE INVENTION

Problems to be Solved by the Invention

The apparatus disclosed in the patent reference literature 1 simplifies the road shapes through processing such as linearization or orthogonalization over a specific range containing a route connecting a departure point and a destination point. For this reason, the positional relationship between the two points in the original map is still substantially sustained in the simplified map. However, the simplified map generated by the apparatus disclosed in the patent reference literature 1 may not always be ideal for display at an on-vehicle information terminal such as a car navigation system that is required to provide display of the approximate distance between the two points, roads to intersect the route ahead and the like in a user-friendly manner.

MEANS FOR SOLVING THE PROBLEMS

An on-vehicle information terminal according to the present invention comprises a current position detection unit that detects the current position of the subject vehicle, a route setting unit that sets a route from the current position of the subject vehicle detected by the current position detection unit to a destination and a display control unit that displays at a display device an enlarged map around the next guidance-requiring intersection on the route having been set by the route setting unit. The display control unit displays the enlarged map by displaying the current position and the next guidance-requiring intersection in a single screen at the display device and rendering the route between the two points as a straight line.

It is desirable that the display control unit of the on-vehicle information terminal displays a road intersecting the route between the current position and the next guidance-requiring intersection as a straight line intersecting the route rendered as the straight line as described above.

In addition, it is desirable that the display control unit of the on-vehicle information terminal displays a road by selecting one of a plurality of roads intersecting the route between the current position and the next guidance-requiring intersection based upon the road type classifications of individual roads.

It is desirable that the display control unit of the on-vehicle information terminal extracts a road classified as a road type with a highest rank among the plurality of roads intersecting the route between the current position and the next guidance-requiring intersection and selects and displays only one road closest to the current position if a plurality of roads are extracted.

The display control unit of the on-vehicle information terminal may display a river or a railway track crossing the route between the current position and the next guidance-requiring intersection as a line intersecting the route rendered as a straight line as described earlier.

In addition, it is desirable that the display control unit of the on-vehicle information terminal indicates a distance from the current position to the road, the river or the railway track displayed as described above.

When the road, the river or the railway track is displayed as the line intersecting the route rendered as the straight line at the on-vehicle information terminal described above, the display control unit should preferably adjust the display position of the intersecting point at which the road, the river or the railway track intersects the route in conformance to the ratio of the distance from the current position to the next guidance-requiring intersection and the distance between the current position and the intersecting point.

An on-vehicle information terminal in another mode of the present invention, comprising a current position detection unit that detects the current position of the subject vehicle, a route setting unit that sets a route from the current position of the subject vehicle detected by the current position detection unit to a destination and a display control unit that displays at a display device an enlarged map around the next guidance-requiring intersection on the route having been set by the route setting unit, is characterized in that a plurality of display modes are available for displaying the enlarged map and that the display control unit displays the enlarged map by switching to one of the plurality of display modes.

It is desirable that three different display modes, including a mode for displaying a simple enlarged map by displaying a map at a predetermined scaling factor over a specific range around the next guidance-requiring intersection, a mode for displaying a linear enlarged map in which the route between the current position and the next guidance-requiring intersection is rendered as a straight line, and a mode for displaying an alternative enlarged map by displaying an abridged map generated by abridging the map over a range containing the current position and the next guidance-requiring intersection, are available for displaying the enlarged map at the on-vehicle information terminal and that the display control unit displays one of the simple enlarged map, the linear enlarged map or the alternative enlarged map.

In addition, it is desirable that the display control unit of the on-vehicle information terminal switches to one of the plurality of display modes for displaying the enlarged map in correspondence to the distance between the current position and the next guidance-requiring intersection.

Alternatively, the display control unit of the on-vehicle information terminal may switch to one of the plurality of display modes for displaying the enlarged map in conformance to the results of a selection made by the user.

The display control unit of the on-vehicle information terminal may display the simple enlarged map if the distance between the current position and the next guidance-requiring intersection is smaller than a first threshold value, may display the linear enlarged map if the distance between the current position and the next guidance-requiring intersection is equal to or greater than the first threshold value and is also smaller than a second threshold value, and may display the alternative enlarged map if the distance between the current position and the next guidance-requiring intersection is equal to or greater than the second threshold value.

It is to be noted that, when displaying the linear enlarged map, the display control unit of the on-vehicle information terminal should preferably indicate the current position and the next guidance-requiring intersection at a first position and a second position respectively with fixed on the screen and render the route extending between the first position and the second position as a straight line, and when displaying the alternative enlarged map, the display control unit should create the abridged map by linearizing and orthogonalizing the shapes of roads on the map.

EFFECT OF THE INVENTION

According to the present invention, the display control unit indicates the current position and the next guidance-requiring intersection at fixed positions on the screen and renders the route extending between the two positions as a straight line. As a result, the route between the current position and the next guidance-requiring intersection can be indicated in an easy-to-read enlarged map simplified so as to suit an application in the on-vehicle information terminal.

In addition, the enlarged map can be displayed in a plurality of display modes and the display control unit selects a specific display mode for enlarged map screen display. Thus, the enlarged map of the area around the route extending between the current position and the next guidance-requiring intersection can be displayed in the optimal display mode that is best suited for the current conditions.

BEST MODE FOR CARRYING OUT THE INVENTION

Figure 1:
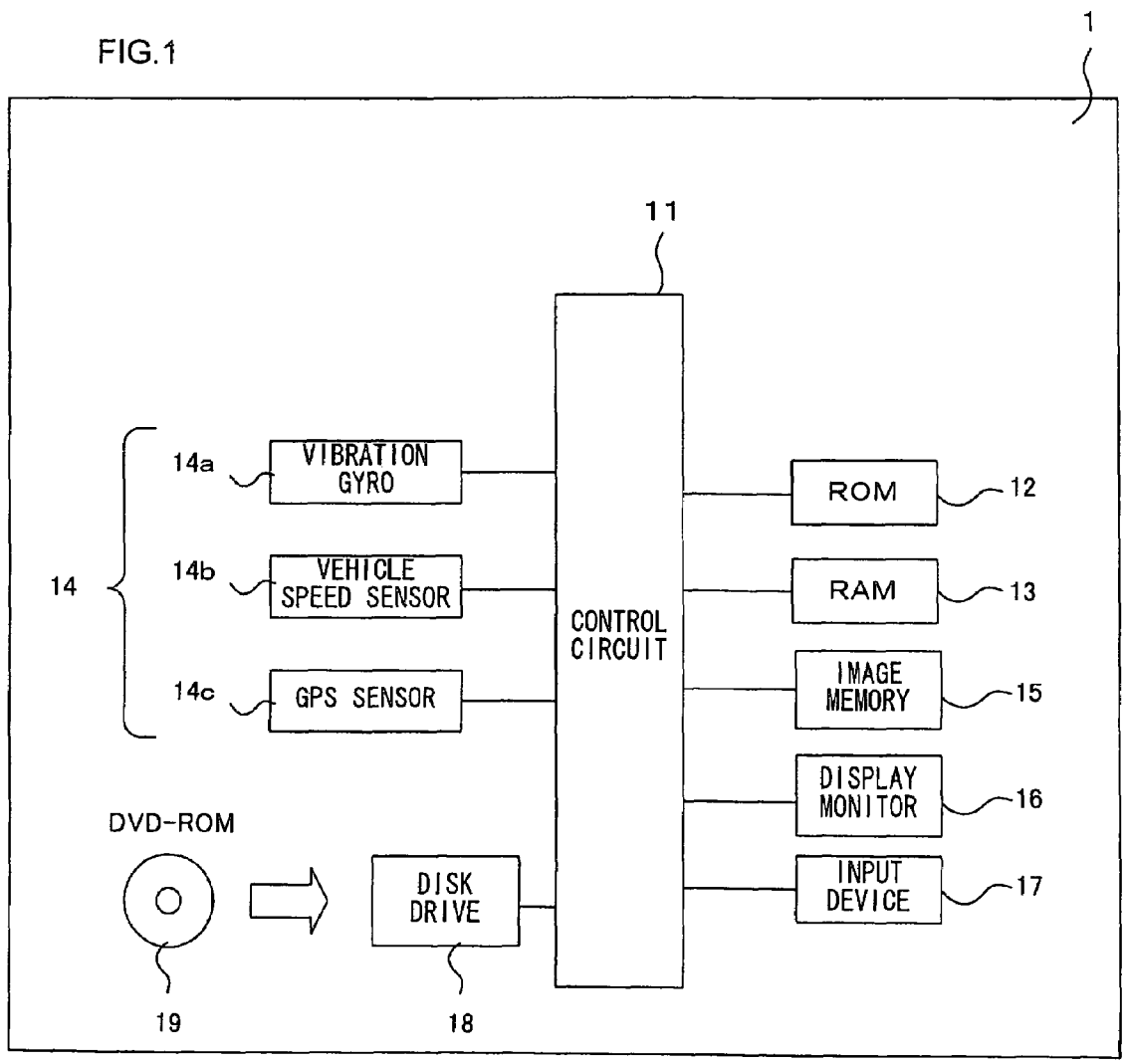
FIG. 1 is a block diagram of the structure adopted in the navigation system achieved in an embodiment of the present invention.

FIG. 1 shows the structure adopted in the navigation system achieved in an embodiment of the present invention. The navigation system, which is installed in a vehicle, indicates the current position of the subject vehicle on a regular map and also displays an enlarged map of an area around the next guidance-requiring intersection in conformance to the distance to the intersection. It is to be noted that the specific details of the terms such as the "next guidance-requiring intersection" and the "enlarged map" as referred to in this context are to be provided later. The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of processing and control. As the control circuit 11 executes enlarged map display processing to be detailed later, an enlarged map of an area around the next guidance-requiring intersection is displayed at the display monitor 16 based upon the map data recorded in the DVD-ROM 19.

The current position detection device 14, which detects the current position of the subject vehicle, may comprise, for instance, a vibration gyro 14*a* that detects the advancing direction of the subject vehicle, a vehicle speed sensor 14*b* that detects the vehicle speed, a GPS sensor 14*c* that detects a GPS signal transmitted from a GPS satellite and the like. Based upon the current position of the subject vehicle detected by the current position detection device 14, the navigation system 1 determines the range over which the map is to be displayed, a route search start point and the like, and displays the current position of the subject vehicle on the map.

In the image memory 15, image data to be displayed at the display monitor 16 are stored. The image data include road map drawing data and various types of graphic data, which are selected as appropriate based upon map data read by the disk drive 18 from the DVD-ROM 19 having the map data recorded therein. The navigation system 1 is enabled to display a map and the like by using the image data thus selected.

The display monitor 16, which operates under control implemented by the control circuit 11, provides the user with various types of information such as a regular map of an area around the current position and an enlarged map of an area around the next guidance-requiring intersection through screen display. The input device 17 includes various types of input switches through which the user sets a destination and a waypoint (hereafter simply and collectively referred to as a destination) and may be an operation panel or a remote-control device. By operating the input device 17 as prompted by screen instructions displayed at the display monitor 16, the user is able to set a destination by specifying its geographical name or its position on the map.

The disk drive 18 reads out map data to be used to display a map from the DVD-ROM 19 loaded therein. It is to be noted that while an explanation is given here on an example in which a DVD-ROM is used, map data recorded in a recording medium other than a DVD-ROM, such as a CD-ROM or a hard disk, may be read out by the disk drive 18.

Once the user sets the destination as described, the navigation system 1 determines through an arithmetic operation the route to the destination by setting the current position detected by the current position detection device 14 as a route search start point and using a specific algorithm. The recommended route thus determined is displayed at the display monitor 16 with indicated on the regular map by altering its display mode, e.g., by using a different display color, so as to ensure that it can easily be distinguished from the other roads. As a result, the user is able to check the route on the map at the screen. In addition, the navigation system 1 guides the subject vehicle along the route by providing visual or audio instructions for the user along the advancing direction.

After the route is determined as described above, the navigation system 1 also displays at the display monitor 16 an enlarged map of an area around the intersection to which the subject vehicle present at the current position will travel next. This intersection is one of the intersections at each of which the route is turning. Hereafter these intersections are referred to as the guidance-requiring intersections, and the intersection described above which is one of the guidance-requiring intersections is referred to as the next guidance-requiring intersection. The enlarged map mentioned above provides the user with specific information with regard to the next guidance-requiring intersection such as the direction of the turn and the distance from the current position in an easy-to-read form. It is to be noted that unless otherwise specified, the term "guidance-requiring intersection" used in the following explanation of the enlarged map refers to the next guidance-requiring intersection.

It is to be noted that the screen display of the enlarged map should be distinguishable from the map display of the regular map having been explained earlier. For instance, the screen may be split horizontally or vertically so as to display the regular map and the enlarged map separately in the individual split screens. Alternatively, the display may be changed over between the enlarged map display and the regular map display automatically in correspondence to conditions such as the distance and the time or in response to a user operation.

The navigation system 1 is capable of displaying the enlarged map in one of three display modes. In the first display mode, a map of a predetermined range around the guidance-requiring intersection is displayed in an enlargement by displaying the regular map at a predetermined scaling factor. The display of this enlarged map, in which the roads around the guidance-requiring intersection are indicated accurately, is ideal when the subject vehicle is nearing the guidance-requiring intersection. In the following description, the enlarged map displayed in the first display mode is referred to as a simple enlarged map.

In the second display mode, the route extending between the current position and the guidance-requiring intersection is indicated as a straight line and information related to the route between the current position and the guidance-requiring intersection is provided on the enlarged map by displaying a road or the like intersecting the route extending between the current position and the guidance-requiring intersection. The display of this enlarged map, in which an approximate distance between the current position and the guidance-requiring intersection and a road intersecting the route are indicated in an easy-to-read format, is ideal when the distance from the subject vehicle to the guidance-requiring intersection is not very large. In the following description, the enlarged map displayed in the second display mode is referred to as a linear enlarged map.

In the third display mode, a map generated by abridging the regular map (hereafter this map is referred to as an abridged map), which is abridged by simplifying the shapes of the roads and the like in the regular map over a range set so as to contain the current position and the guidance-requiring intersection, is displayed as an enlarged map. The display of this enlarged map, in which an approximate positional relationship between the current position and the guidance-requiring intersection is indicated in an easy-to-read format, is ideal when the distance between the subject vehicle and the guidance-requiring intersection is significant. Hereafter, the enlarged map displayed in the third display mode is referred to as an alternative enlarged map. It is to be noted that the method for generating the abridged map is to be explained later.

Figure 2:
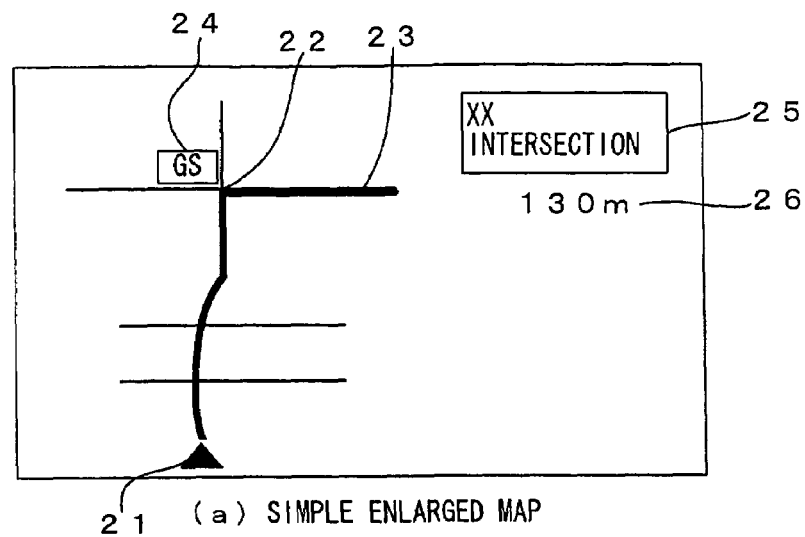
FIG. 2 presents examples of enlarged maps, with FIG. 2(*a*) showing a simple enlarged map, FIG. 2(*b*) showing a linear enlarged map and FIG. 2(*c*) showing an alternative enlarged map.
Figure 2:
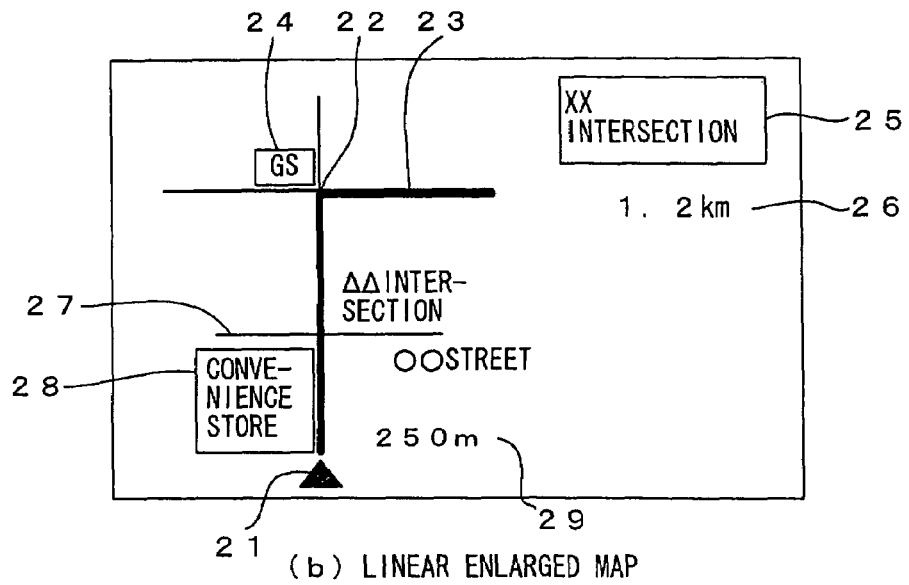
Figure 2:
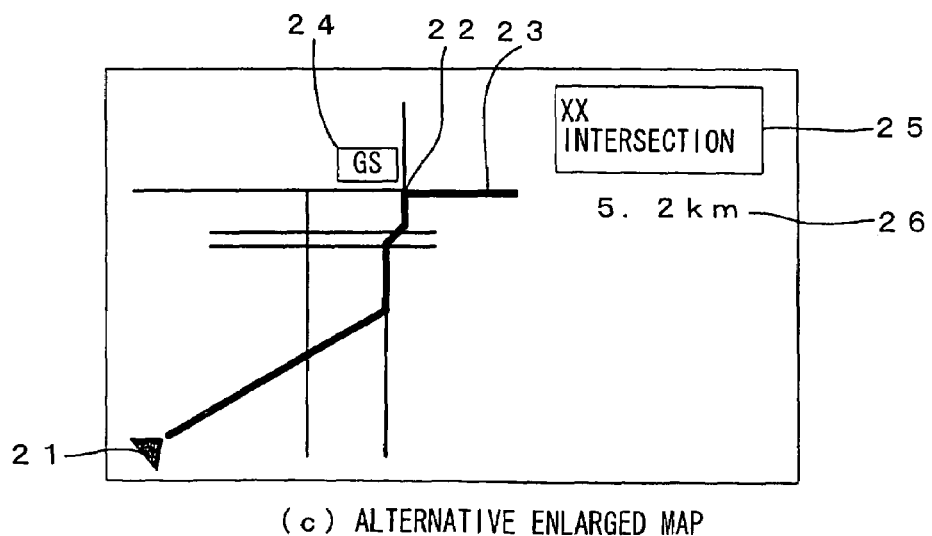

FIG. 2 presents examples of the three different types of enlarged maps explained above. FIGS. 2(*a*), 2(*b*) and 2(*c*) respectively present examples of the simple enlarged map, the linear enlarged map and the alternative enlarged map. In each of the enlarged maps, a subject vehicle position mark 21 indicating the current position and a next guidance-requiring intersection 22 are displayed, with a route 23 indicated by using a display color different from the color of the other roads. In addition, as a landmark near the guidance-requiring intersection 22, a gas station 24 is indicated in the map. The name "XX intersection" of the guidance-requiring intersection 22 is displayed as indicated by reference numeral 25 in a separate display area in addition to the map display, with the distance from the current position (the subject vehicle position mark) 21 to the guidance-requiring intersection 22 displayed as indicated by reference numeral 26 under the display area 25.

The simple enlarged map in FIG. 2(*a*) is an enlarged map of a specific range around the guidance-requiring intersection 22, which is a regular map displayed at a predetermined scaling factor. Thus, as the current position (the subject vehicle position) changes as the subject vehicle travels on, the subject vehicle position mark 21, too, moves on the enlarged map displayed on the screen so that the display range of the enlarged map remains unchanged. If the current vehicle position moved outside the specific display range, the subject vehicle position mark 21 is no longer displayed in the enlarged map. It is to be noted that the enlarged map on display is oriented so that the vehicle traveling on the route 23 about to enter the guidance-requiring intersection 22 heads straight up on the screen.

The linear enlarged map in FIG. 2(*b*) includes the subject vehicle position mark 21 and the guidance-requiring intersection 22 indicated at fixed display positions on the screen so that the current position and the next guidance-requiring intersection are displayed inside a single screen at all times. A straight line connecting between the current position and the next guidance-requiring intersection indicates the route 23 extending from the current position (subject vehicle position mark) 21 to the guidance-requiring intersection 22. Thus, even as the current vehicle position changes, the subject vehicle position mark 21 and the guidance-requiring intersection 22 remain at the same positions on the screen and the range of the enlarged map on display changes to indicate the changing current vehicle position on the enlarged map with the subject vehicle position mark 21.

The linear enlarged map provides information with regard to the route between the current position (the subject vehicle position mark) 21 and the guidance-requiring intersection 22 such as a road 27 intersecting the route 23, the name of the road 27 and the name of intersection at which the road 27 intersects the route 23. In addition, a convenience store 28 is displayed as a landmark near the intersection, and the distance from the current position (subject vehicle position mark) 21 to the intersection is displayed as indicated by reference numeral 29 along the route 23 preceding the intersection. It is to be noted that no such information is displayed if no road intersects the route 23 extending from the current position (the subject vehicle position mark) 21 and the guidance-requiring intersection 22.

If there is a plurality of roads intersecting the route 23, it is desirable to select one of the plurality of roads for display. For instance, based upon road types into which individual roads are classified (express highway, national highway, prefectural road, etc.), the road classified as a road type with the highest rank should be selected. It is to be noted that the road types are ranked in the order of "express highway", "national highway" and "prefectural road", and the road types other than those are ranked lower than the "prefectural road". A road that crosses the route 23 with an overpass or underpass may be excluded from the selection.

If a river, a railway track or the like crosses the route 23, the river or the railway track crossing the route 23 may be displayed instead of an intersecting road. Since a river or the like is not readily visible at night, the criteria for selecting a river or the like over an intersecting road may be adjusted in correspondence to the time of day or the season. In addition, if the vehicle is currently traveling on an express highway along the route 23, it is desirable to indicate junctions, entries/exits, service areas, parking areas and the like as the information with regard to the route between the current position 21 and the guidance-requiring intersection 22, since regular roads intersecting an express highway are not always readily ascertained.

The alternative enlarged map in FIG. 2(c) is an abridged map taken over a range set so as to contain the current position 21 and the guidance-requiring intersection 22. Thus, as the current vehicle position changes, the range of the map on display changes, and since the positional relationship between the current position 21 and the guidance-requiring intersection 22 also changes as indicated by the positions at which the current position and the guidance-requiring intersection are displayed move on the screen. The subject vehicle position mark 21 is thus made to move on the enlarged map. It is to be noted that the enlarged map on display is oriented so that the vehicle traveling on the route 23 about to enter the guidance-requiring intersection 22 heads straight up on the screen, as in the case of the simple enlarged map shown in FIG. 2(a).

Next, the method for generating the abridged map executed to display the alternative enlarged map is explained. The abridged map is created by executing processing referred to as streamline processing on map data within a map range having been set. The method of the streamline processing is of the known art. The following is an explanation of the contents of the streamline processing.

Figure 3:
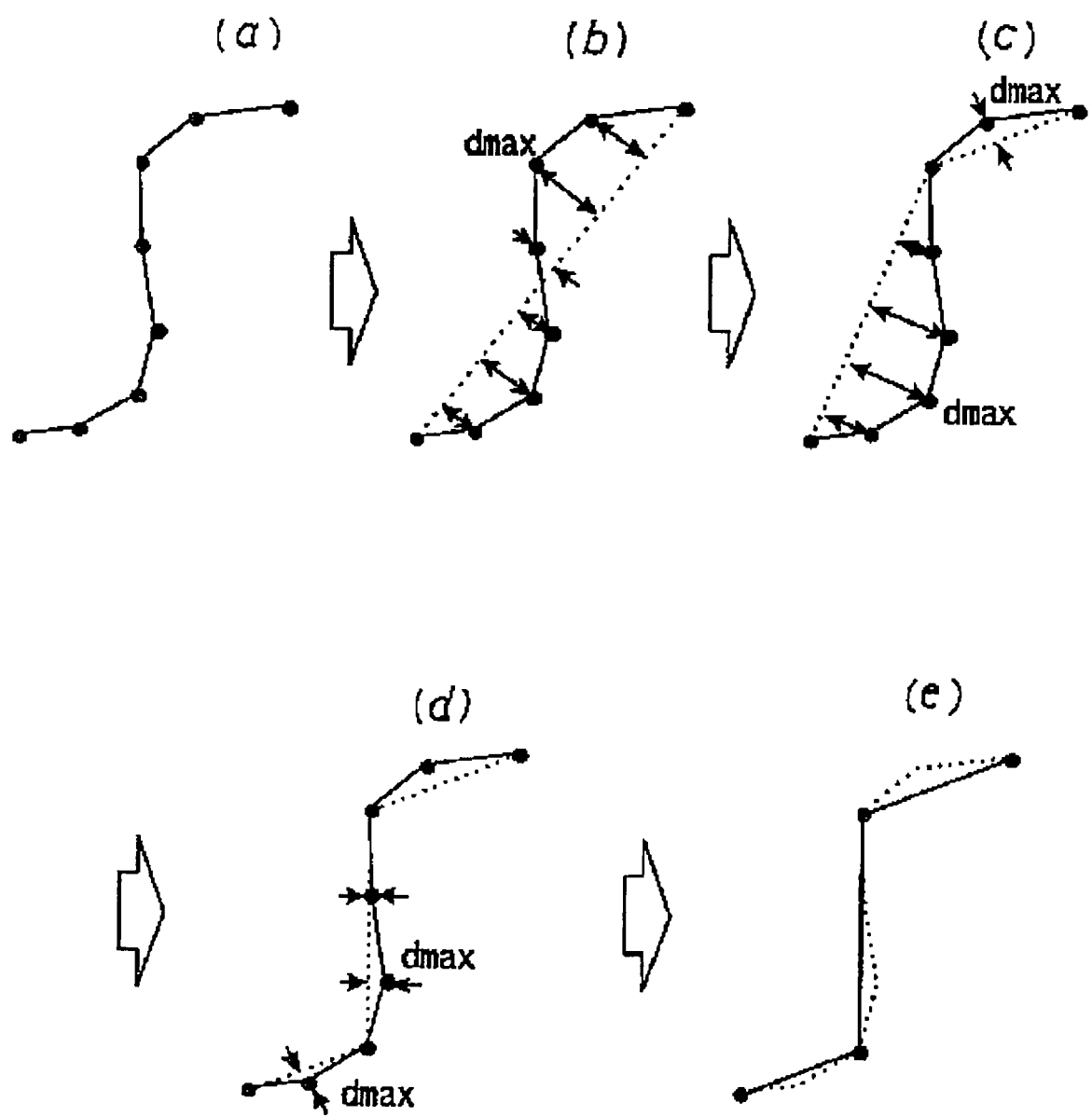
FIG. 3 illustrates streamline processing (1) executed to create an abridged map.
Figure 4:
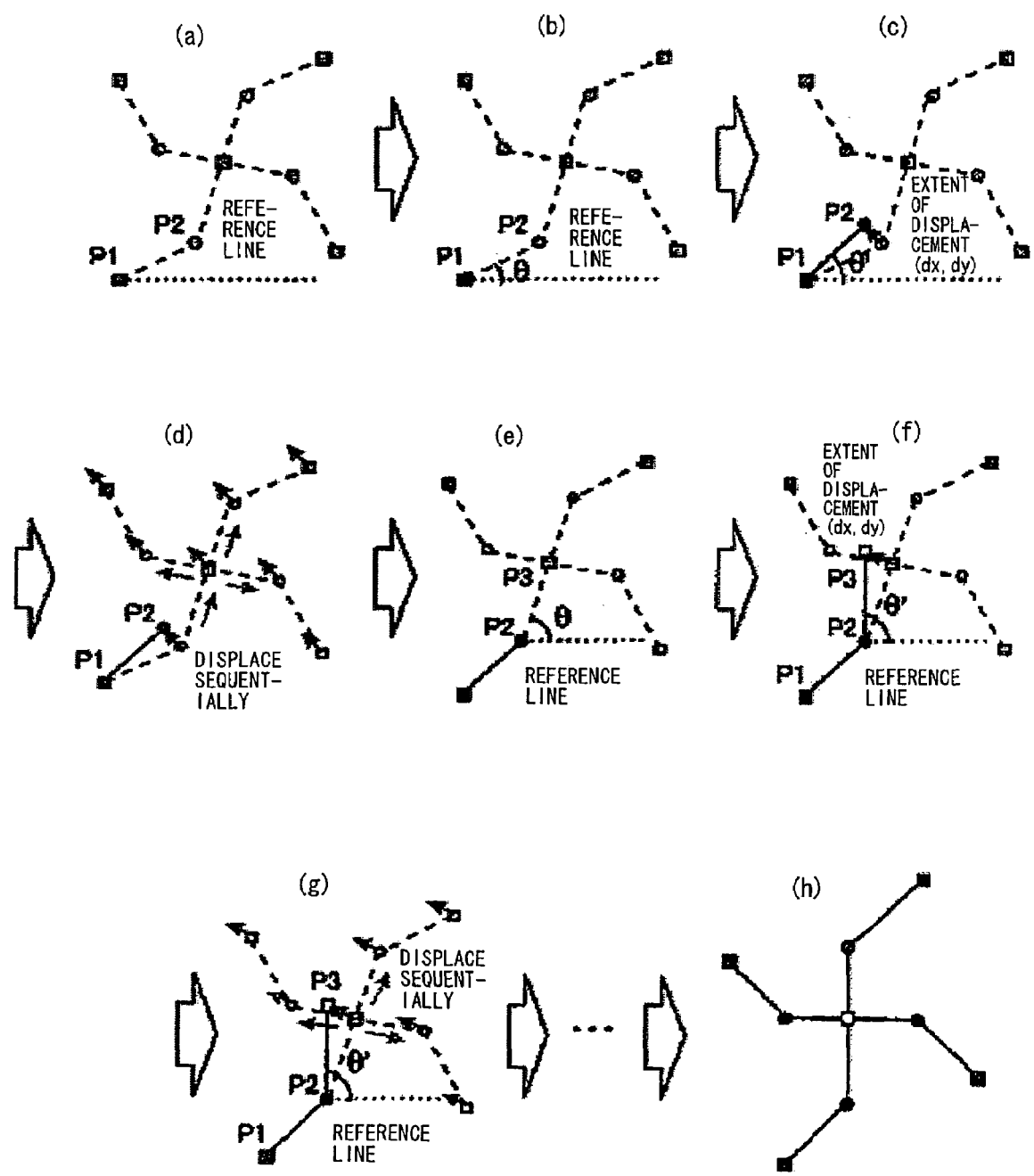
FIG. 4 illustrates streamline processing (2) also executed to create an abridged map.

FIGS. 3 and 4 illustrate in detail the streamline processing executed to generate the abridged map according to the present invention. In reference to FIG. 3, streamline processing (1) through which the shape of a road is linearized (the data of the make-up points constituting the road are culled) is explained. The shape of each road in the map data used in the processing is defined by a group of makeup points referred to as nodes, each having positional information (coordinate information).

Lets us now assume that the shape of the actual road is as indicated in FIG. 3(a). The lengths of the perpendiculars connecting the individual points with the line (the dotted line) that connects the two end points (referred to as the first end point and the second end point) are measured and the largest perpendicular length dmax among them is determined. Then, if dmax thus ascertained is determined to be equal to or greater than a predetermined value setting $\epsilon$ (if dmax=1>$\epsilon$), the corresponding make-up point is retained. Namely, as shown in FIG. 3(c), the point corresponding to dmax is added as a new end point (to be referred to as a third end point) and lines connecting the first end point with the third end point and the third end point with the second end point are drawn as indicated with the dotted lines.

Processing similar to that described above is repeatedly executed until the largest perpendicular length dmax becomes smaller than $\epsilon$. In the state shown in FIG. 3(d), dmax is invariably smaller than $\epsilon$. At this time, the shape of the road is indicated with straight lines connecting end points closest to each other. As a result, the road shape shown in FIG. 3(e) is achieved. Through this processing, the shape of the road is linearized.

FIG. 4 shows streamline processing (2) through which the shapes of roads are orthogonalized. Assuming that the shapes of the actual roads are as shown in FIG. 4(a), a straight line extending parallel to the x-axis (the horizontal direction in the map), which passes through a first point (P1) in a first polygonal line, is determined. This straight line indicated with the dotted line in the figure is used as a reference line. Next, as shown in FIG. 4(b), the angle $\theta$ formed by the vector P1P2 connecting the point P1 and the next point P2 relative to the reference line is determined.

Next, as shown in FIG. 4(c), the vector P1P2 is rotated around the start point P1 so that $\theta'=n\cdot\Delta\theta$ (n is an integer) when the vector length is fixed. As a result, the end point P2 becomes displaced. It is to be noted that the angle $\Delta\theta$ may be, for instance, 45°. Through this processing, the angle formed by the vector P1P2 and the reference line is corrected in the increments of the unit angle of 45°.

Then, as illustrated in FIG. 4(d), beyond the point P2, the displacement of points is sequentially propagated by an extent matching the displacement (dx, dy) of the point P2. During this process, an intersection is displaced to branch points. Thus, the positions of the other points are displaced through propagation of the displacement.

Subsequently, processing similar to that described above is repeatedly executed. Namely, as shown in FIG. 4(e), a straight line passing through the point P2 and running parallel to the x-axis is designated as a reference line and the angle $\theta$ formed by the next vector P2P3 and the reference line is determined. Then, as shown in FIG. 4(f), the vector P2P3 is rotated around the start point P2 so that $\theta'$ becomes equal to $n\cdot\Delta\theta$, and thus, the end point P3 is displaced. Subsequently, as illustrated in FIG. 4(g), the displacement of points is propagated beyond the point P3 by an extent matching the displacement (dx, dy) of the point P3. During this process, an intersection is displaced to branch points.

As the processing described above is executed for all the points in sequence by repeating similar operations, the road shapes shown in FIG. 4(h) are ultimately achieved. Through the processing, the road shapes are orthogonalized. Once the road shapes are linearized and orthogonalized as described above, the streamline processing ends. The abridged map is created by executing the streamline processing over the map range having been set. It is to be noted that while the position of each landmark is corrected as necessary during this processing, the method for the landmark position correction and the like is of the known art and for this reason, its detailed explanation is omitted.

Figure 5:
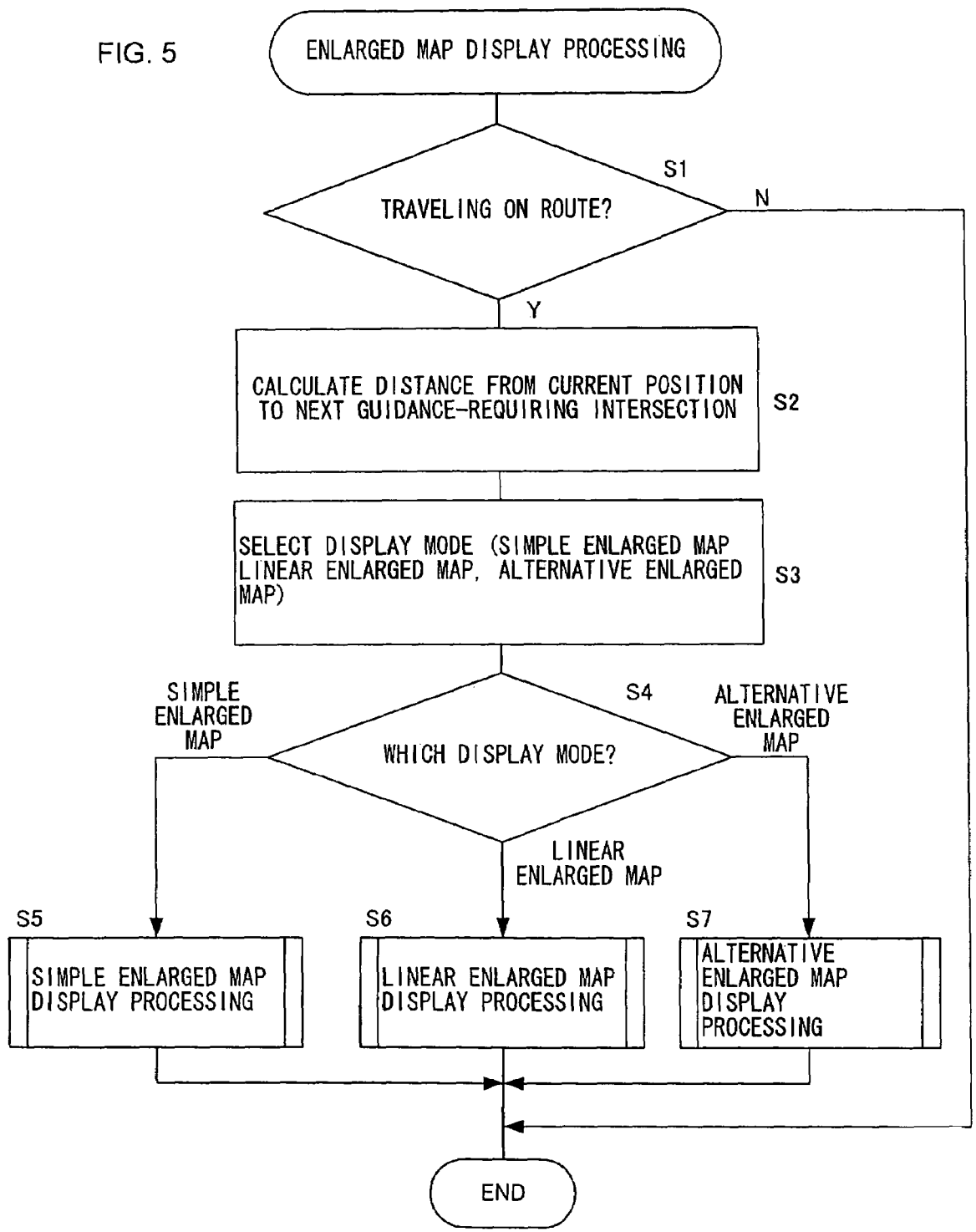
FIG. 5 presents a flowchart of the enlarged map display processing executed to bring up a screen display of an enlarged map to a guidance-requiring intersection.

FIG. 5 presents a flowchart of the enlarged map display processing executed by the control circuit 11 for displaying an enlarged map to the guidance-requiring intersection. The processing in the flowchart presented in FIG. 5 is executed every time the subject vehicle travels a predetermined distance or each time a predetermined length of time elapses, assuming that the route is set in advance. It is to be noted that a decision as to whether or not the subject vehicle has traveled a predetermined distance may be made by calculating the distance having been traveled by the subject vehicle based upon the distance by which the subject vehicle current position detected by the current position detection device 14 has been displaced.

In step S1, a decision is made as to whether or not the subject vehicle is traveling on the route having been set. The operation proceeds to step S2 if the subject vehicle is judged to be traveling on the route, whereas the processing flow in FIG. 5 ends otherwise. In step S2, the distance from the current position to the guidance-requiring intersection is calculated. Based upon the distance thus calculated, the display mode for the enlarged map display is selected in step S3. The display mode can be selected from the three different display modes (the simple enlarged map, the linear enlarged map and the alternative enlarged map) explained earlier, and a subsequent display mode is selected if the distance calculated in step S2 is greater. For instance, threshold values T1 and T2 (T1<T2) may be set in advance, and the simple enlarged map display mode, the linear enlarged map display mode and the alternative enlarged map display mode should be selected respectively if D<T1, if T1=/<D<T2 and if T2=/<D with D representing the distance from the current position to the guidance-requiring intersection calculated in step S2.

In step S4, a decision is made as to which display mode has been selected in step S3. Based upon the results of the decision, the operation proceeds to step S5 if the simple enlarged map display mode has been selected, the operation proceeds to step S6 if the linear enlarged map display mode has been selected and the operation proceeds to step S7 if the alternative enlarged map display mode has been selected. In steps S5, S6 and S7, simple enlarged map display processing, linear enlarged map display processing and alternative enlarged map display processing are respectively executed. Once these processing is executed, the processing flow in FIG. 5 ends.

Next, the details of the processing executed in steps S5, S6 and S7 are explained individually. First, the details of the simple enlarged map display processing executed in step S5 are explained in reference to the flowchart presented in FIG. 6. In step S11, map data over the predetermined range around the guidance-requiring intersection are read out. In step S12, the map of the area around the guidance-requiring intersection is displayed at the display monitor 16 at a predetermined scaling factor based upon the map data having been read out in step S11. The enlarged map of the area around the guidance-requiring intersection is thus brought up on display. It is assumed that a specific fixed range over which the map data are read out in step S11 is set in advance in correspondence to the scaling factor at which the map is scaled and the display range of the display monitor 16 over which the map is displayed in the subsequent step S12.

In step S13, the route that has been set in advance and the current position mark are displayed over the enlarged map having been brought up on display in step S12. In step S14, the names of the roads on the route, a landmark near the next guidance-requiring intersection and the like are displayed on the enlarged map, and the name of the guidance-requiring intersection is displayed in a special display area separately from the enlarged map. It is to be noted that data used to display such information in step S14 are included in the map data having been read out in step S11.

In step S15, the distance from the current position to the next guidance-requiring intersection having been calculated in step S2 in FIG. 5 is displayed in a special display area separately from the enlarged map. The distance may be indicated at a display position under the display area in which the name of the next guidance-requiring intersection has been brought up on display in step S14. Once the processing in step S15 is completed, the operation returns to the processing flow in FIG. 5. As the simple enlarged map display processing is executed as explained above, a simple enlarged map such as that shown in FIG. 2(*a*) is displayed.

Figure 6:
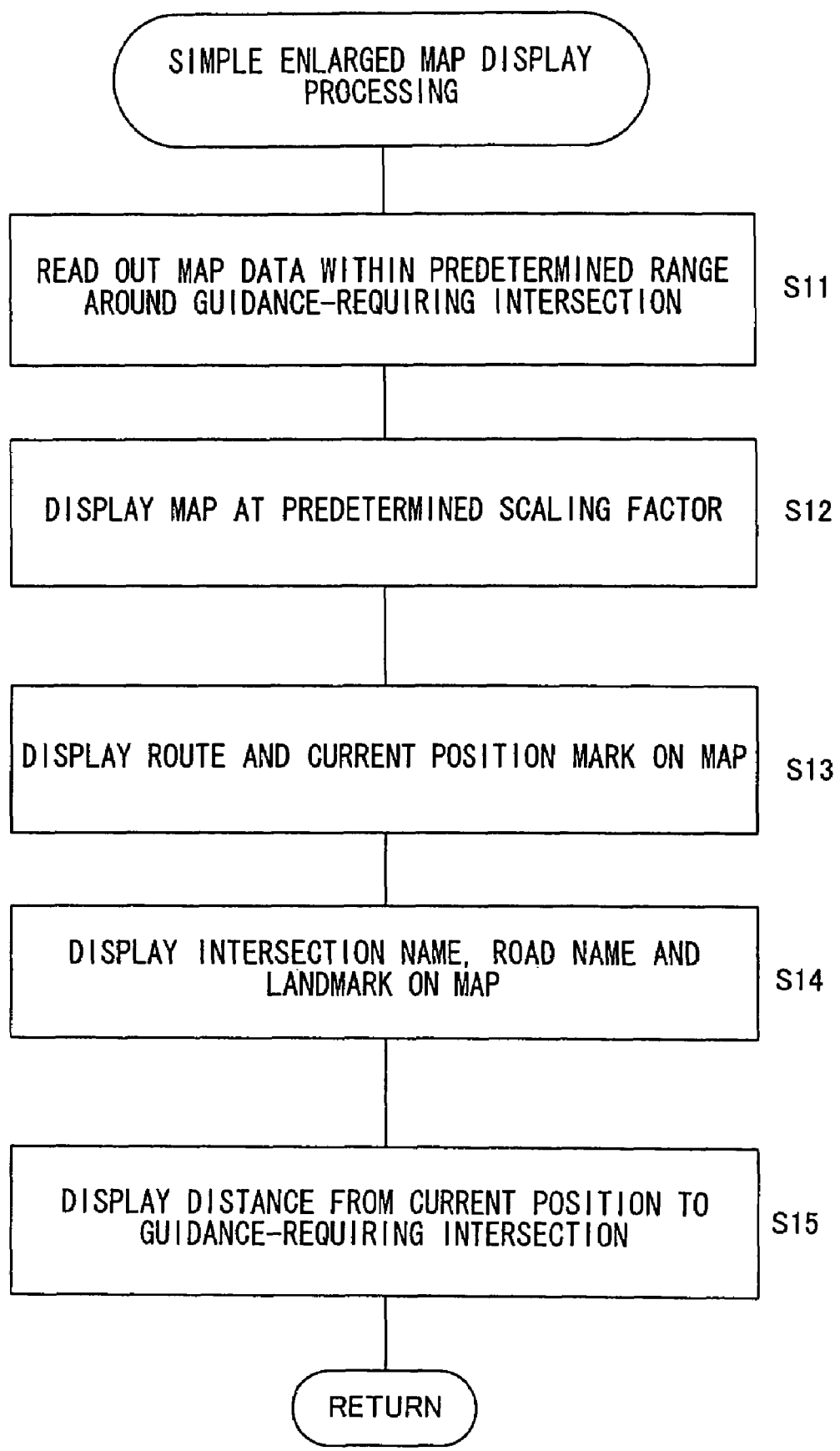
FIG. 6 presents a flowchart of the simple enlarged map display processing.
Figure 7:
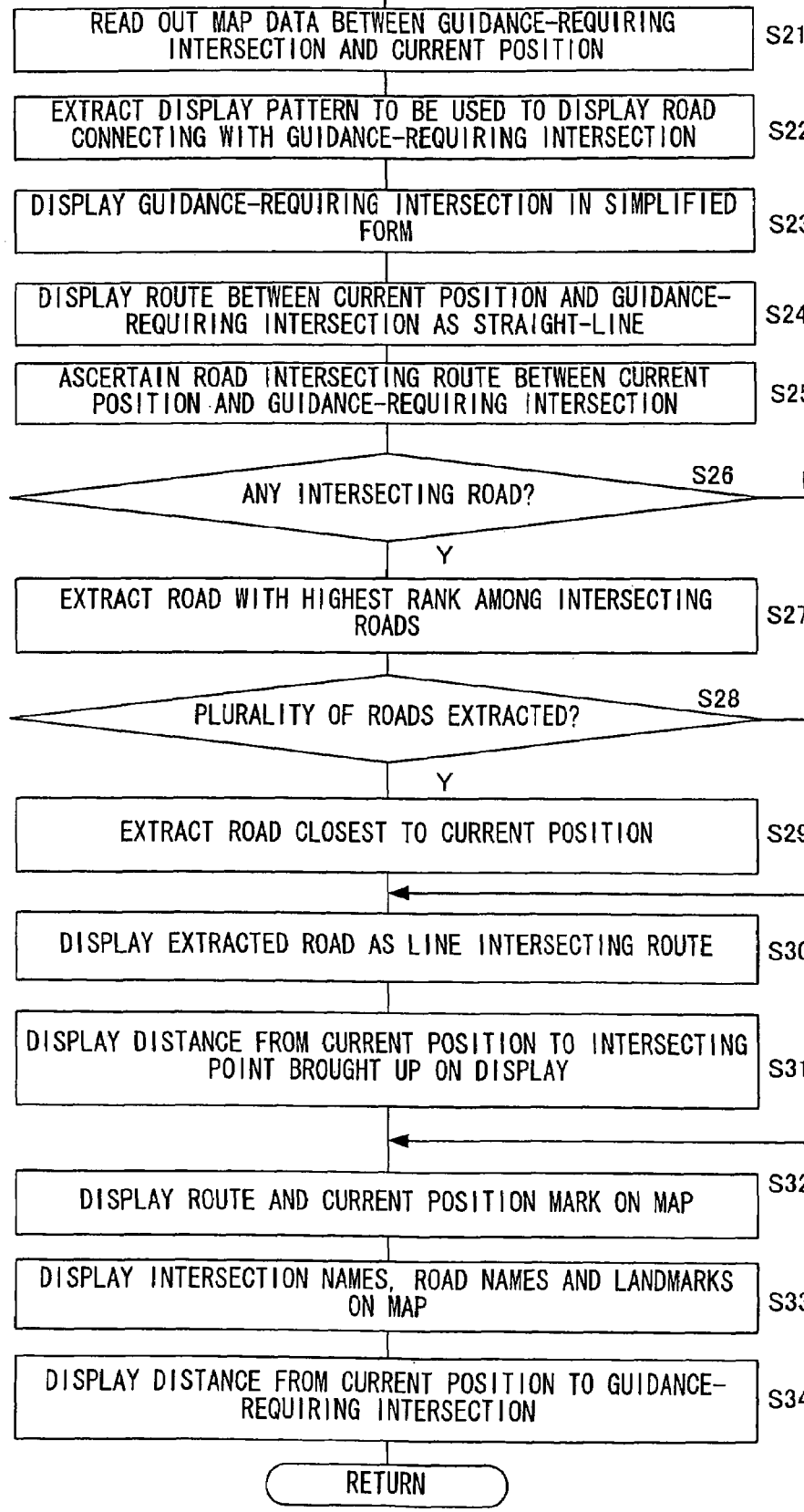
FIG. 7 presents a flowchart of the linear enlarged map display processing.

Next, the linear enlarged map display processing executed in step S6 is explained in reference to the flowchart presented in FIG. 7. In step S21, map data within a predetermined range along the route extending between the guidance-requiring intersection and the current position are read out. The range over which the map data are read out in this step, which is a variable range set in correspondence to the positional relationship between the current position and the guidance-requiring intersection, is different from the fixed read range over which the map data are read out in step S11 in FIG. 6. It is to be noted that the map data read range is set so as to contain both the next guidance-requiring intersection and the guidance-requiring intersection immediately beyond the next guidance-requiring intersection if the two guidance-requiring intersections are located over a distance from each other that is equal to or less than a predetermined distance.

In step S22, a display pattern to be used to indicate the guidance-requiring intersection is extracted from a plurality of display patterns stored in memory in advance based upon the map data having been read out in step S21. For instance, depending upon the number of connecting roads, the angle with which the roads intersect and the like, the most suitable display pattern among a 3-forked road display pattern, a T-junction display pattern, a right-angle crossroad display pattern, a diagonal crossroad display pattern and the like should be selected and extracted. In step S23, the guidance-requiring intersection is displayed in a simplified form by displaying the display pattern having been extracted in step S22 at the display monitor 16. At this time, the guidance-requiring intersection is displayed in the simplified form at a specific position set in advance on the screen. The enlarged map of the area around the guidance-requiring intersection is thus brought up on display.

In step S24, the route extending from the current position having been set on the screen to the guidance-requiring intersection having been brought up on display in step S23 is indicated as a straight line connecting the two points. The route between the current position and the guidance-requiring intersection is thus indicated in the enlarged map. In step S25, based upon the map data having been read out in step S21, any road intersecting the straight-line having been indicated in step S24, i.e., the route extending from the current position to the guidance-requiring intersection, is ascertained. In step S26, a decision is made as to whether or not any intersecting road has been ascertained in step S25. The operation proceeds to step S27 if there is at least one intersecting road, whereas the operation proceeds to step S32 if there is no intersecting road.

In step S27, a road classified as the highest ranked road type among the intersecting roads having been ascertained in step S25 is selected and extracted. The road types as referred to in this context include "express highway", "national highway" and "prefectural road" as explained earlier, with an express highway ranked higher than a national highway and a national highway ranked higher than a prefectural road. In addition, a road not classified as any of these road types is ranked lower than a prefectural road. If there is only one intersecting road, the road is extracted, regardless of its road type. Information on the road types of the individual roads is included in the map data having been read out in step S21.

As described earlier, a river, a railway track or the like crossing the route may be extracted in step S27 instead of a road intersecting the route. It is to be noted that data indicating rivers, railway tracks and the like are recorded as background data included in the map data. Unlike the road data in which connection information for each road is recorded, the background data do not include connection information indicating connections with the route. For this reason, a decision as to whether or not a river or a railway track in the background data actually crosses the route cannot be made simply based upon the data. Accordingly, a decision is made as to whether or not the river or the railway track crosses the route based upon the positional relationship between the route and the background object. More specifically, the river, the railway track or the like is extracted from the background data contained in the map area set in correspondence to the route, and a decision is made as to whether or not the river or the railway track is located between the current position and the guidance-requiring intersection based upon the positional information (coordinate information) on the positions of the river or the railway track and the route. Through this process, a decision can be made as to whether or not the river or the railway track crosses the route extending from the current position to the guidance-requiring intersection.

In step S28, a decision is made as to whether or not a plurality of roads have been extracted in step S27. Explicitly, a decision is made as to whether or not at least two intersecting roads with substantially equal ranks have been extracted. For instance, if no express highway intersects the route but two or more national highways intersect the route, the plurality of national highways are extracted in step S27. If a plurality of roads have been extracted, an affirmative decision is made in step S28 and the operation proceeds to step S29. If, on the other hand, only a single road has been extracted, the operation proceeds to step S30.

In step S29, a single road closest to the current position among the plurality of roads having been extracted in step S27 is selected and extracted. In step S30, either the single road having been extracted in step S27 (when a negative decision has been made in step S28) or the single road having been extracted from the plurality of roads in step S29 (when an affirmative decision has been made in step S28) is displayed as a straight line intersecting the route having been brought up on display as a straight line in step S24. The road intersecting the route at a point preceding the guidance-requiring intersection is thus brought up on display in the enlarged map.

It is to be noted that the position at which the route and the road intersect each other on the display brought up in step S30 may be adjusted based upon the ratio of the actual distance from the current position to the guidance-requiring intersection (referred to as distance A) and the actual distance between the current position and the intersecting point at which the route and the road intersect each other (referred to as distance B). In such a case, when the distance A is 1 km and the distance B is 250 m, for instance, the intersecting road should be displayed on the screen at a position matching the ratio, i.e., at the position ¼ of the way to the guidance-requiring intersection from the current vehicle position. Alternatively, the intersecting road may be indicated at a position corresponding to a different fraction in correspondence to the ratio of the distance A and the distance B, or the intersecting road may be indicated at a fixed position instead.

In step S31, the distance from the current position to the intersecting point having been brought up on display in step S30 at which the route and the road intersect is displayed. The distance is displayed along the route 23 preceding the intersecting point. In steps S32 through S34, processing similar to the processing executed in steps S13 through S15 in FIG. 6 is executed. Namely, in step S32, the route having been already set and the current position mark are indicated on the enlarged map, and in step S33, the road name and a landmark are indicated on the enlarged map, with the intersection name indicated in a special display area.

It is to be noted that when displaying the road name and the landmark in step S33, the road name and the landmark corresponding to the road having been brought up on display in step S30 which intersects the route at a point preceding the guidance-requiring intersection are also indicated, and furthermore, the name of the intersection is indicated, in addition to the name of the road on the route and the name of the guidance-requiring intersection. Then, in step S34, the distance from the current position to the guidance-requiring intersection is brought up on display in a special display area separately from the enlarged map. Once the processing in step S34 is completed, the operation returns to the processing flow in FIG. 5. By executing the linear enlarged map display processing as explained above, a linear enlarged map such as that shown in FIG. 2(b) is brought up on display.

Figure 8:
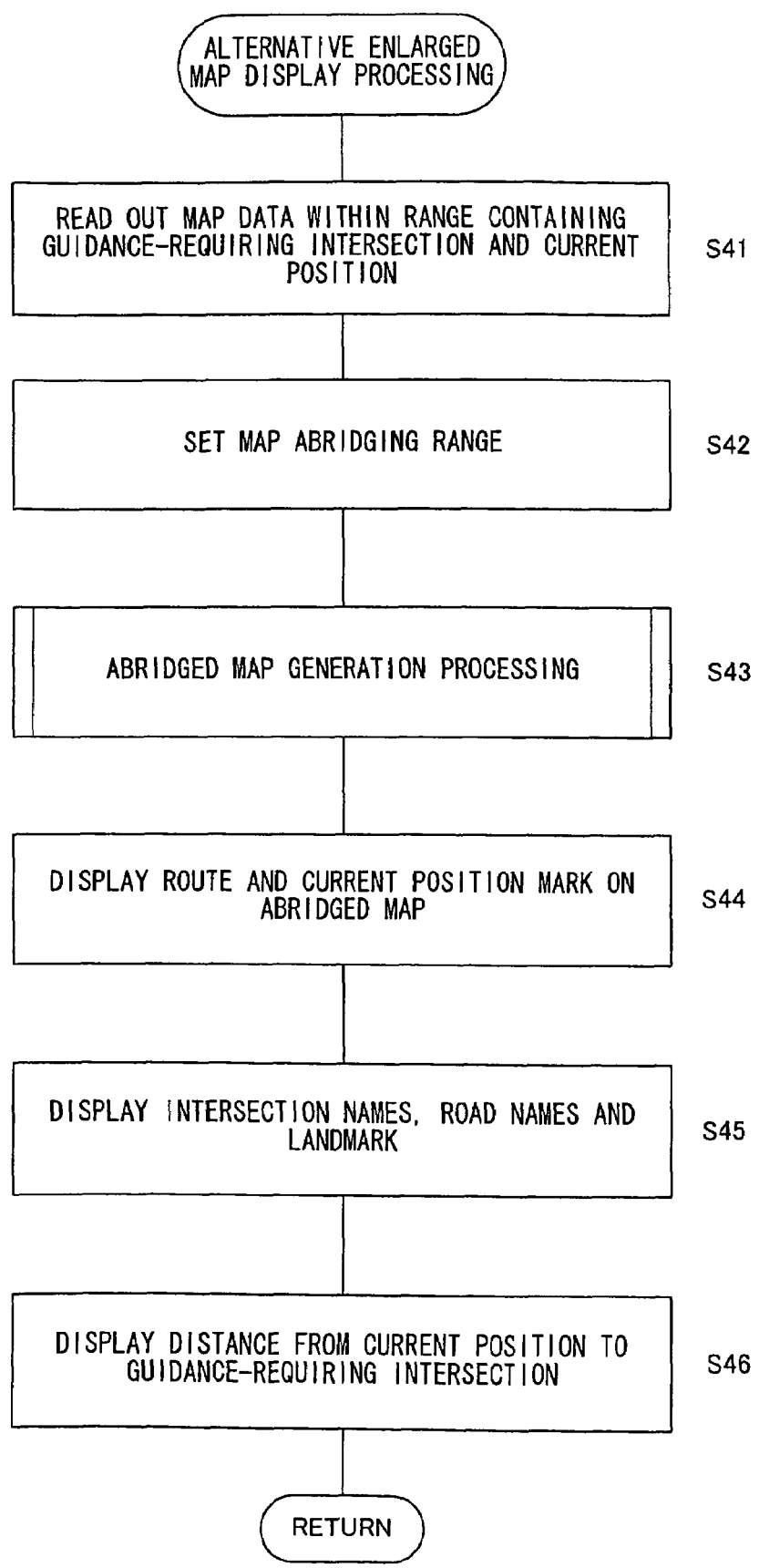
FIG. 8 presents a flowchart of the alternative enlarged map display processing.

Next, the alternative enlarged map display processing executed in step S7 is explained in reference to the flowchart presented in FIG. 8. In step S41, map data over a range that contains the guidance-requiring intersection and the current position are read out. The map data are read out over a variable range set so as to contain the current position and the guidance-requiring intersection in correspondence to the positional relationship between the current position and the guidance-requiring intersection, and this range may be defined as an oval area, the focal points of which are set at the current position and the guidance-requiring intersection. This range is different from the fixed read range over which the map data are read out in step S11 in FIG. 6 or the read range set along the route over which the map data are read out in step S21 in FIG. 7. It is to be noted that the map data read range should be set so as to contain both the next guidance-requiring intersection and the guidance-requiring intersection present immediately beyond the next guidance-requiring intersection, if the two guidance-requiring intersections are present within a distance equal to or less than a predetermined distance.

In step S42, the range over which the abridged map is to be generated is set. This range may match the range over which the map data have been read out in step S41 or a smaller range may be set. The range should be set by ensuring that it contains at least the guidance-requiring intersection and the current position. In step S43, and abridged map is generated over the range set in step S42. Since the method for the abridged map generation has already been explained, a repeated explanation is omitted. The abridged map is displayed as an enlarged map within the set range.

In steps S44 through S46, processing similar to that executed in steps S13 through S15 in FIG. 6 is executed. Namely, in step S44, the route having been already set and the current position mark are indicated on the enlarged map, and in step S45, the road name and a landmark are indicated on the enlarged map, with the intersection name indicated in a special display area. Then, in step S46, the distance from the current position to the guidance-requiring intersection is displayed in a special display area separately from the enlarged map. Once the processing in step S46 is completed, the operation returns to the processing flow in FIG. 5. As the linear enlarged map display processing is executed as explained above, an alternative enlarged map such as that shown in FIG. 2(c) is brought up on display.

The embodiment explained above achieves the following advantages.

(1) Through the linear enlarged map display processing, the current position and the next guidance-requiring intersection are indicated within a single screen at the display monitor at fixed positions on the screen, and the route extending between the current position and the next guidance-requiring intersection on display is indicated as a straight line. As a result, an enlarged map along the route extending from the current position to the next guidance-requiring intersection is displayed in an easy-to-read format.

(2) A road intersecting the route between the current position and the next guidance-requiring intersection is indicated as a straight line intersecting the route, which is also rendered as a straight line. The display allows information related to the route between the current position and the next guidance-requiring intersection to be provided on the enlarged map and allows the user to use the information for reference while driving to the next guidance-requiring intersection. A similar advantage may be achieved by displaying a river or a railway track intersecting the route instead of a road intersecting the route.

(3) If there are a plurality of roads intersecting the route extending between the current position and the next guidance-requiring intersection, one of them is selected for display based upon their road types. At this time, the road classified as the most highly ranked road type is extracted, and if a plurality of roads is extracted as such, the closest road from the current position among them is selected and displayed. Thus, if there is a plurality of roads intersecting the route, only the road most suited to be used for reference is selected for display.

(4) In addition, the distance from the current position to the road, the river or the railway track intersecting the route on display is indicated, and thus, the user is able to verify the distance to the intersecting reference point on display.

(5) By altering the position of the intersecting point at which the road, the river or the railway track intersects the route on display in correspondence to the ratio of the distance between the current vehicle position and the next guidance-requiring intersection and the distance between the current vehicle position and the intersecting point at which the road or the like intersects the route, the relationship of the distance between the current position to the intersecting point displayed for reference and the distance from the current position to the guidance-requiring intersection can be indicated in an easy-to-read format.

(6) A plurality of enlarged map display modes are available and one display mode among them is selected for the screen display. More specifically, the enlarged map is brought up on display in one of the three different display modes, i.e., the simple enlarged map display mode, the linear enlarged map display mode and the alternative enlarged map display mode. As a result, the enlarged map around the route extending between the current position and the next guidance-requiring intersection can be displayed in the optimal display mode in correspondence to the specific current conditions.

(7) A specific enlarged map display mode is selected in correspondence to the distance from the current position to the next guidance-requiring intersection. More specifically, if the distance between the current position and the next guidance-requiring intersection is greater, the linear enlarged map display mode is selected over the simple enlarged map display mode and the alternative enlarged map display mode is selected over the linear display mode. For instance, if the distance is smaller than the threshold value T1, the simple enlarged map display mode is selected. The linear enlarged map display mode is selected if the distance is equal to or greater than the threshold value T1 but is smaller than the threshold value T2 and the alternative enlarged map display mode is selected for screen display if the distance is equal to or greater than the threshold value T2. As a result, in correspondence to the distance from the current position to the next guidance-requiring intersection, the enlarged map is displayed in the optimal display mode.

It is to be noted that an explanation is given in reference to the embodiment on an example in which the enlarged map display mode is switched in correspondence to the distance from the current position to the next guidance-requiring intersection. However, the enlarged map display mode may be switched based upon the results of a selection made by the user through a user operation of the input device 17, in conformance to conditions set in advance by the user or the like. In this case, the enlarged map can be displayed in an easy-to-read format in the display mode preferred by the user.

In addition, while an explanation is given above in reference to the embodiment on an example in which only one road intersecting the route extending from the current position to the guidance-requiring intersection is selected for display through the linear enlarged map display processing, a plurality of intersecting roads may be displayed instead. In such a case, the number of intersecting roads selected for display may be adjusted in correspondence to the distance between the current position and the guidance-requiring intersection.

While an explanation is given above in reference to the embodiment on an example in which the map data are read out from a storage medium such as a DVD-ROM, the present invention is not limited to this example. For instance, the present invention may also be adopted in a communication navigation system or the like that downloads the map data from an information distribution center through wireless communication achieved by using a portable telephone or the like. In such an application, the enlarged map display processing explained above may be executed at the information distribution center.

Figure 9:
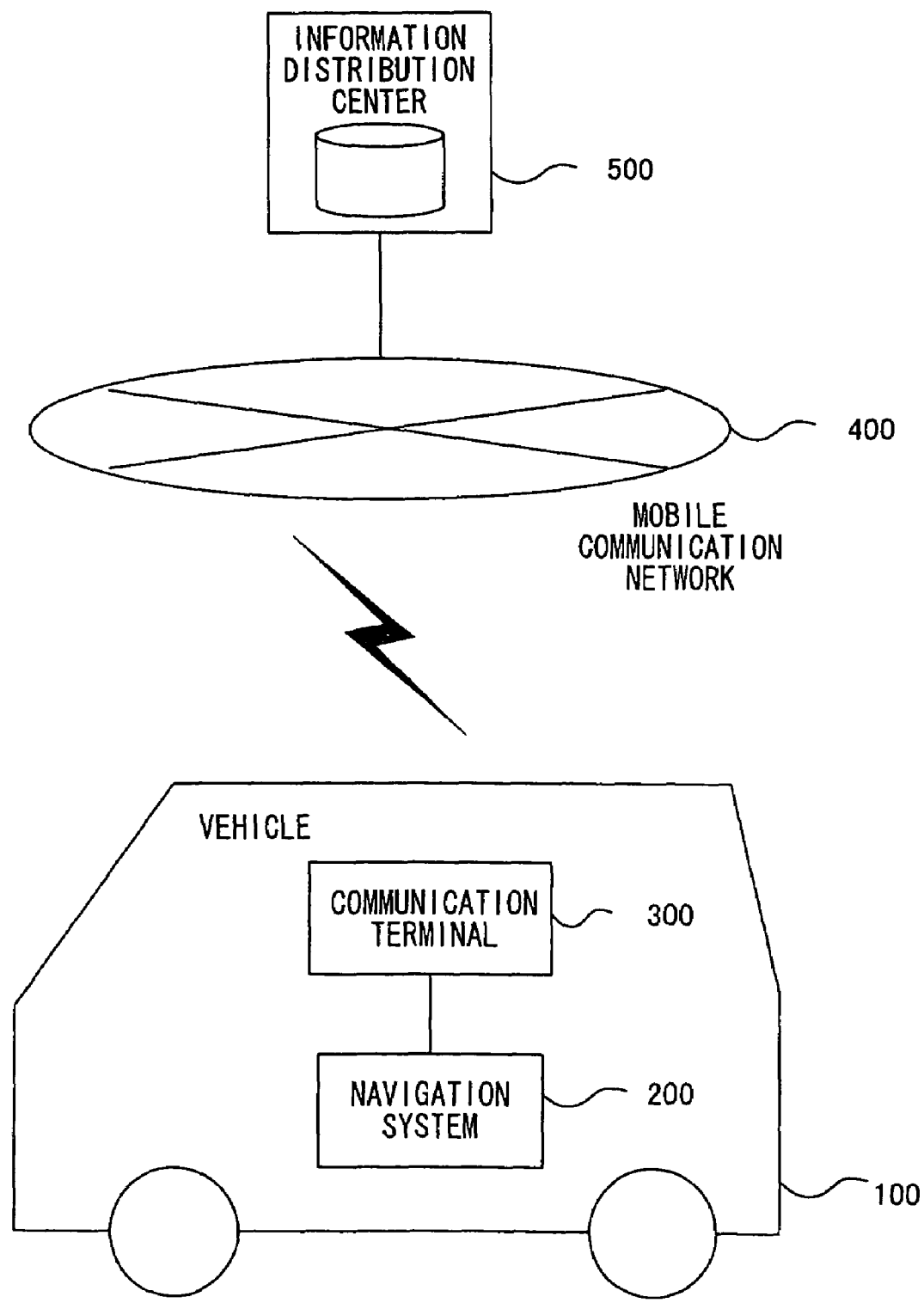
FIG. 9 shows how the present invention may be adopted in a communication navigation system.

FIG. 9 shows a configuration in conjunction with which the present invention may be adopted in such an application. A communication terminal 300 is connected to a navigation system 200 installed in a vehicle 100. This communication terminal 300 may be a portable telephone. The communication terminal 300 is wirelessly connected with a mobile communication network 400. The mobile communication network 400 is connected with an information distribution center 500. Namely, the navigation system 200 is connected to the information distribution center 500 via the communication terminal 300 and the mobile communication network 400. Upon establishing a connection with the information distribution center 500, the navigation system 200 transmits a map data transmission request to the information distribution center 500. In response to the transmission request, the information distribution center 500 executes the processing, the details of which have been explained earlier and transmits the map data to the navigation system 200. The navigation system 200 receives the map data transmitted from the information distribution center 500 via the mobile communication network 300 and the communication terminal 200. Thus, the present information can be adopted in conjunction with a communication navigation system as well.

Figure 10:
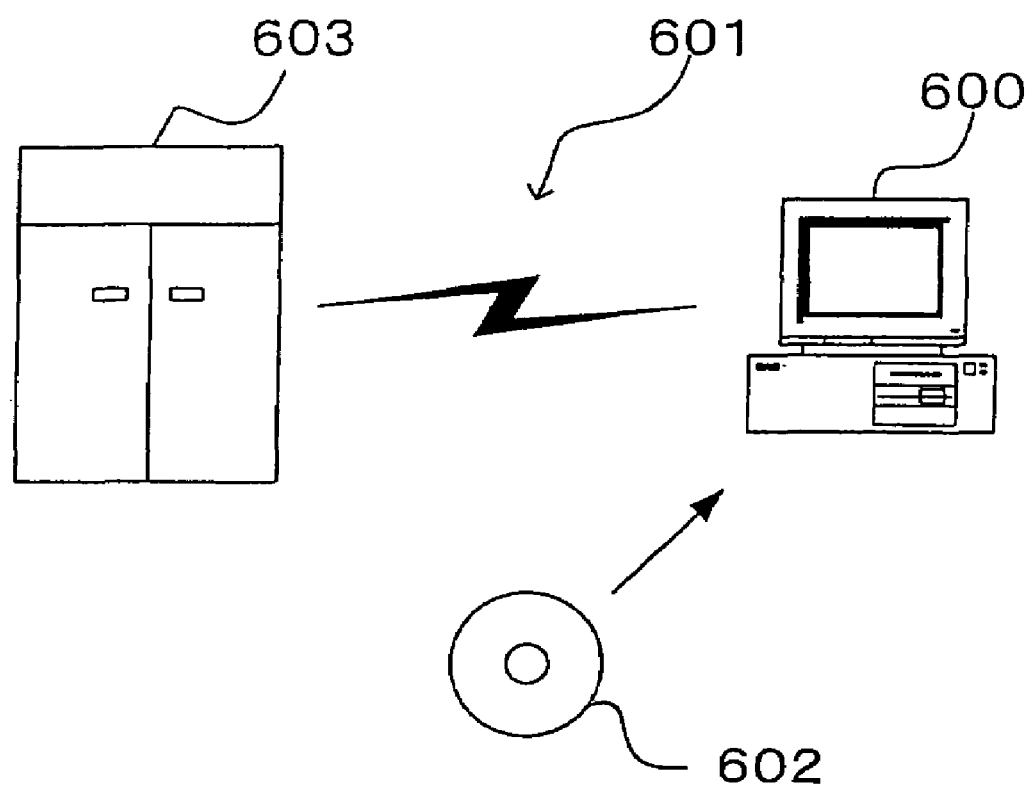
FIG. 10 shows how the present invention may be adopted in conjunction with a personal computer.

It is to be noted that when the present invention is adopted in a personal computer or the like, a program that enables the control explained above can be provided in a recording medium such as a CD-ROM or through an electric communication network such as the Internet. FIG. 10 shows how the program may be provided. A personal computer 600 receives the program via a CD-ROM 602. The personal computer 600 is also capable of achieving a connection with a communication line 601 through which the program can be provided by a server 603. The communication line 601 may be a communication line for enabling Internet communication, personal computer communication or the like, or it may be a dedicated communication line. The server 603 transmits the program to the personal computer 600 via the communication line 601. Namely, the program converted to a data signal on a carrier wave is transmitted via the communication line 601. Thus, the program can be distributed as a computer-readable computer program product adopting any of various modes such as a recording medium and a carrier wave.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

What is claimed is:

1. An on-vehicle information terminal, comprising:
a current position detection unit that detects a current position of a subject vehicle;
a route setting unit that sets a route from the current position of the subject vehicle detected by the current position detection unit to a destination; and
a display control unit that displays at a display device an enlarged map around a next guidance-requiring intersection on the route having been set by the route setting unit, wherein:
the display control unit displays the enlarged map by displaying the current position and the next guidance-requiring intersection in a single screen at the display device and rendering the route extending between the current position and the next guidance-requiring intersection as a straight line, even in a case that the route extending between the current position and the next guidance-requiring intersection is curved.

2. An on-vehicle information terminal according to claim 1, wherein:
the display control unit displays a road intersecting the route between the current position and the next guidance-requiring intersection as a straight line intersecting the route rendered as a straight line, even in a case that the route between the current position and the next guidance-requiring intersection is curved.

3. An on-vehicle information terminal according to claim 2, wherein:
the display control unit displays a road by selecting one of a plurality of roads intersecting the route between the current position and the next guidance- requiring intersection based upon road type classification.

4. An on-vehicle information terminal according to claim 3, wherein:
the display control unit extracts a road classified as a road type with a highest rank among the plurality of roads intersecting the route between the current position and the next guidance-requiring intersection; and
the display control unit selects and displays only one road closest to the current position if a plurality of roads are extracted.

5. An on-vehicle information terminal according claim 4, wherein:
the display control unit indicates a distance from the current position to the road, a river or a railway track which are displayed.

6. An on-vehicle information terminal according to claim 4, wherein:
when displaying a road, a river or the railway track as the line intersecting the route rendered as the straight line, the display control unit adjusts a display position of an intersecting point at which the road, the river or the railway track intersects the route in conformance to a ratio of the distance from the current position to the next guidance-requiring intersection and the distance between the current position and the intersecting point.

7. An on-vehicle information terminal according to claim 3, wherein:
the display control unit indicates a distance from the current position to the road, a river or a railway track which are displayed.

8. An on-vehicle information terminal according to claim 3, wherein:
when displaying a road, a river or the railway track as the line intersecting the route rendered as the straight line, the display control unit adjusts a display position of an intersecting point at which the road, the river or the railway track intersects the route in conformance to a ratio of the distance from the current position to the next guidance-requiring intersection and the distance between the current position and the intersecting point.

9. An on-vehicle information terminal according to claim 2, wherein:
the display control unit indicates a distance from the current position to the road, a river or a railway track which are displayed.

10. An on-vehicle information terminal according to claim 2, wherein:
when displaying the road, a river or a railway track as the line intersecting the route rendered as the straight line, the display control unit adjusts a display position of an intersecting point at which the road, the river or the railway track intersects the route in conformance to a ratio of the distance from the current position to the next guidance-requiring intersection and the distance between the current position and the intersecting point.

11. An on-vehicle information terminal, comprising:
a current position detection unit that detects a current position of a subject vehicle;
a route setting unit that sets a route from the current position of the subject vehicle detected by the current position detection unit to a destination; and
a display control unit that displays at a display device an enlarged map; around the next guidance-requiring intersection on the route having been set by the route setting unit, wherein:
a plurality of display modes are available for displaying the enlarged map; and
the display control unit displays the enlarged map by switching to one of the plurality of display modes;
three different display modes, including a mode for displaying a simple enlarged map by displaying a map at a predetermined scaling factor over a specific range around the next guidance-requiring intersection, a mode for displaying a linear enlarged map in which the route between the current position and the next guidance-requiring intersection is rendered as a straight line, and a mode for displaying an alternative enlarged map by displaying an abridged map generated by abridging a map over a range containing the current position and the next guidance-requiring intersection, are available for displaying the enlarged map; and the display control unit displays one of the simple enlarged map, the linear enlarged map or the alternative enlarged map.

12. An on-vehicle information terminal according to claim 11, wherein:

the display control unit displays the simple enlarged map if the distance between the current position and the next guidance-requiring intersection is smaller than a first threshold value, displays the linear enlarged map if the distance between the current position and the next guidance-requiring intersection is equal to or greater than the first threshold value and is also smaller than a second threshold value, and displays the alternative enlarged map if the distance between the current position and the next guidance-requiring intersection is equal to or greater than the second threshold value.

13. An on-vehicle information terminal according to claim 12, wherein:

when displaying the linear enlarged map, the display control unit indicates the current position and the next guidance-requiring intersection at a first position and a second position, respectively, fixed on the screen and renders the route extending between the first position and the second position as a straight line; and when displaying the alternative enlarged map, the display control unit creates the abridged map by linearizing and orthogonalizing the shapes of roads on the map.

14. An on-vehicle information terminal according to claim 11, wherein:

when displaying the linear enlarged map, the display control unit indicates the current position and the next guidance-requiring intersection at a first position and a second position respectively with fixed on the screen and renders the route extending between the first position and the second position as a straight line; and when displaying the alternative enlarged map, the display control unit creates the abridged map by linearizing and orthogonalizing the shapes of roads on the map.

15. An on-vehicle information terminal according to claim 11, wherein:

the display control unit switches to one of the plurality of display modes for displaying the enlarged map in correspondence to the distance between the current position and the next guidance-requiring intersection.

* * * * *

UNITED STATES PATENT AND TRADEMARK OFFICE
CERTIFICATE OF CORRECTION

PATENT NO. : 7,636,634 B2 Page 1 of 1
APPLICATION NO. : 10/569377
DATED : December 22, 2009
INVENTOR(S) : Sumizawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Eighteenth Day of January, 2011

David J. Kappos
*Director of the United States Patent and Trademark Office*